United States Patent
Akgul et al.

(10) Patent No.: US 7,830,908 B2
(45) Date of Patent: Nov. 9, 2010

(54) SYSTEMS AND METHODS OF REDUCING DELAY IN DECODING

(75) Inventors: Tankut Akgul, Istanbul (TR); Ali C. Begen, Santa Clara, CA (US); William Ver Steeg, Alpharetta, GA (US)

(73) Assignee: Cisco Technologies, Inc., San Jose, CA (US)

( * ) Notice: Subject to any disclaimer, the term of this patent is extended or adjusted under 35 U.S.C. 154(b) by 123 days.

(21) Appl. No.: 12/264,198

(22) Filed: Nov. 3, 2008

(65) Prior Publication Data

US 2010/0111108 A1 May 6, 2010

(51) Int. Cl.
*H04J 3/00* (2006.01)
(52) U.S. Cl. .................................................. 370/464
(58) Field of Classification Search .................. None
See application file for complete search history.

(56) References Cited

U.S. PATENT DOCUMENTS

| | | | | |
|---|---|---|---|---|
| 6,707,867 | B2* | 3/2004 | Diepstraten et al. | 375/354 |
| 7,706,384 | B2* | 4/2010 | van Beek | 370/395.4 |
| 2004/0170199 | A1* | 9/2004 | Golan et al. | 370/516 |
| 2005/0036512 | A1* | 2/2005 | Loukianov | 370/469 |
| 2005/0100054 | A1* | 5/2005 | Scott et al. | 370/503 |
| 2005/0190797 | A1* | 9/2005 | Elliot | 370/503 |
| 2009/0207866 | A1* | 8/2009 | Cholas et al. | 370/505 |
| 2009/0232111 | A1* | 9/2009 | Li et al. | 370/337 |

* cited by examiner

*Primary Examiner*—Chi H Pham
*Assistant Examiner*—Fan Ng
(74) *Attorney, Agent, or Firm*—Merchant & Gould

(57) ABSTRACT

In one embodiment, a method includes inserting a packet containing an interpolated timestamp into a burst media stream. The insertion is responsive to a channel change request. The burst media stream includes a series of cached frames.

15 Claims, 10 Drawing Sheets

SYSTEMS AND METHODS OF REDUCING DELAY IN DECODING

CROSS REFERENCE TO RELATED APPLICATIONS

Not applicable.

FIELD OF THE DISCLOSURE

The present disclosure relates to digital media delivery, and more specifically, to systems and methods of reducing delay in decoding digital media streams.

BACKGROUND

A growing number of consumers now have high-speed, or broadband, connections to the Internet in their homes. The increased bandwidth provided by these broadband connections allows the delivery of digital television, video, and multimedia services to customer premises (e.g., home consumers). These services are transported over a network as media streams. At the customer premises, a digital media receiver decodes one or more media streams. The digital media receiver also generates a video signal for display by a television or monitor. A switch to a different media stream results in a finite amount of delay before the new stream can be decoded and displayed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Overview

Embodiments are disclosed herein that provide systems and methods of reducing media stream delay. One such embodiment is a method which includes inserting a packet containing an interpolated timestamp into a burst media stream. The insertion is responsive to a channel change request. The burst media stream includes a series of cached frames.

Another such embodiment is an apparatus. The apparatus includes means for caching a series of frames from a received media stream. The apparatus further includes means for interpolating a timestamp value based on a selected starting frame from the series of cached frames and on an identified explicit timestamp frame in the series of cached frames. The apparatus further includes means for providing a media stream carrying a packet containing the interpolated timestamp value. The means for interpolating and the means for providing are responsive to receiving a channel change request.

Another such embodiment is an apparatus, which includes memory storing executable instructions thereon, and a processor. The processor is configured by the executable instructions to locate a starting frame in a series of cached frames, responsive to a channel change request. Also responsive to the channel change request, the processor is configured by the executable instructions to identify one of a series of cached frames as an explicit timestamp frame. Also responsive to the channel change request, the processor is configured by the executable instructions to calculate a timestamp value for an early timestamp frame, based on the explicit timestamp frame and the starting frame. Also responsive to the channel change request, the processor is configured by the executable instructions to insert a packet containing the timestamp value into a stream of media packets containing at least a portion of the series of cached frames.

Example Embodiments

Figure 1:
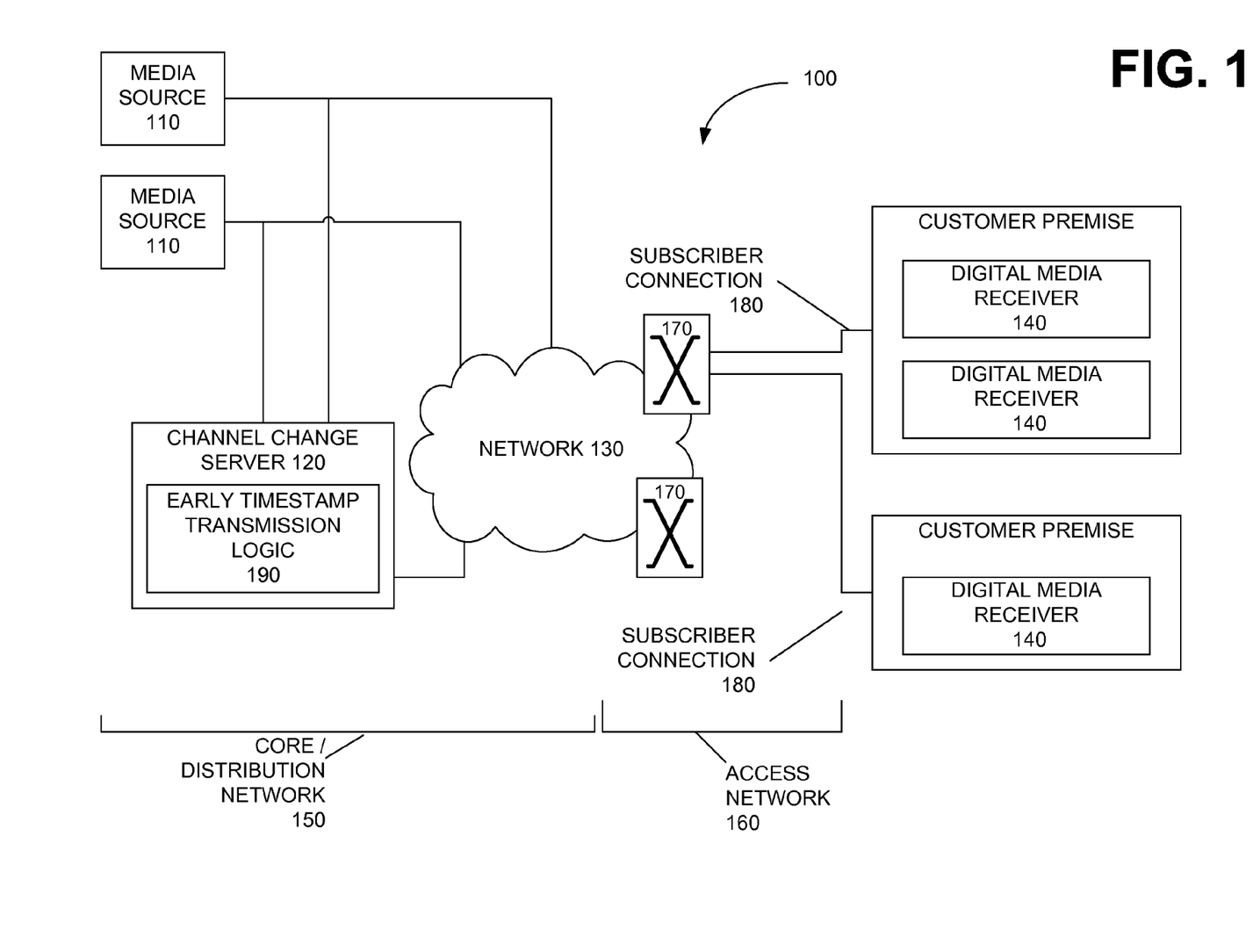
FIG. 1 is a block diagram of an environment in which one embodiment of a system and method for reducing media stream delay is located.

FIG. 1 is a block diagram of an environment in which one embodiment of a system and method for reducing media stream delay is located. System 100 delivers various digital services to subscribers, which may include television programming, video-on-demand, pay-per-view, music, Internet access, shopping, and telephone. These services are delivered using media streams, which may be provided from various sources. One such source is a media source 110, which encodes content from a media source, such as a cable network or an on-air television station. The output of media source 110 is referred to here as a linear media stream because the broadcast programming provided by media source 110 plays out in a linear fashion. In contrast, an "on demand" stream allows portions of the program to be accessed at random in response to a user request. Linear streams produced by media source 110 are captured and buffered for some period of time in a channel change server 120 in order to provide accelerated channel change capabilities, as will be described below. Note that there may be other types of media sources in addition to the encoders.

Other sources of media streams should be familiar to a person of ordinary skill in the art, and are intended to be within the scope of this disclosure. Various media stream sources may be located at a facility known as a "head end"

which is operated by a service provider (e.g., cable television company). However, these components are not limited to residing at that location. Common encoding formats for media streams include MPEG-2, MPEG-4, and VC-1, but others are contemplated to be within the scope of this disclosure. In some environments, the encoded media stream represents a single user program, and thus contains a video elementary stream and an audio elementary stream multiplexed together into a single program transport stream (SPTS).

Media streams are delivered over a network 130 to one or more digital media receivers 140. In the example environment of FIG. 1, network 130 includes a core/distribution network 150 and an access network 160. Multiple media streams are combined and packetized into a media packet stream, in a form which is suitable for transport over core network 150. A media packet stream, carrying multiple user programs that are destined for many different subscribers, is transported over core/distribution network 150, and delivered to various switches 170 located at the network edge. Each switch 170 selects, for a particular subscriber, a subset of the programs carried in media packet stream, and produces a stream which is delivered, via subscriber connections 180, to those subscribers connected to switch 170. In some embodiments the delivered stream uses multicast addresses, while in other embodiments unicast addresses are used.

Digital media receiver 140 receives, via subscriber connection 180, a media packet stream carrying the selected programs. Digital media receiver 140 converts the stream of media packets into an analog or digital video signal, which is supplied to a display (e.g., a television or computer monitor) for viewing by a customer. Some embodiments of digital media receiver 140 also provide interactive features, such as an electronic program guide (EPG), Web browser, or DVR (digital video recorder) functionality. In some embodiments, digital media receiver 140 takes the form of a set-top box. In others, digital media receiver 140 is implemented by a personal computer (PC). The term "digital media receiver" extends to other types of receivers that include the capability to receive and process compressed digital video streams. Examples of other types of receivers include: hand-held and/or mobile receivers that are coupled to a transmission channel which carries media packet streams; video-services-enabled receivers (VSERs); and other electronic devices such as media players.

As explained earlier, a subset of program streams is selected by switch 170 for delivery to a particular subscriber location. Each of these program streams can be viewed as being carried on a different logical channel. Digital media receiver 140 communicates with channel change server 120 to request that particular program streams, or logical channels, be included in the media packet stream received by that subscriber. For example, digital media receiver 140, in response to a user request to watch the FOX network, requests an "accelerated channel change" from channel change server 120, with the target channel as FOX. Although the term "channel change" is used herein, this term is not limited to user requests. This term is also intended to cover requests that are not user-initiated (e.g., an automatic change to a logical channel at a specific time for recording or viewing). The term "channel" is not limited to a traditional television channel, but encompasses any stream associated with a particular media content instance or service.

A channel change (or other stream transition event) causes digital media receiver 140 to begin decoding a different stream. As a result, some amount of delay is incurred before the content of the new stream can be decoded and displayed. Several factors may contribute to this delay. One such factor involves the timestamps used by the decoder in digital media receiver 140.

A typical time-synchronized digital audio/video decoder decodes and presents each audio or video frame by comparing a timestamp associated with the frame to the local decoder clock. A decoding timestamp (DTS) determines when the frame will be provided to the decoder for decoding, while a presentation timestamp (PTS) determines when the decoder outputs the frame for display. In this disclosure, the term "timestamp" can refer to DTS, PTS, or both.

With conventional techniques, not every frame has an explicit timestamp provided in the stream. Instead, the media stream source sends timestamps periodically within a media stream, and the decoder uses the periodically received timestamps as references to interpolate timestamps for those frames that do not have an explicit timestamp. Interpolation cannot start until the first explicit timestamp usable as a starting point reaches the decoder. This explicit timestamp is not required to be associated with any particular frame type.

Conventional techniques do not ensure that the periodic timestamp is aligned with reference frames, yet a reference frame is required before the decoder can actually begin decoding. As a result, the delay between a channel change request and the time decoding begins consists of at least two parts. The first delay—between receiving the first frame in the new (requested) stream and receiving the first explicit timestamp in the new stream—has a maximum value equal to the maximum timestamp interarrival time specified by the encoding standard. After the first explicit timestamp is received, the decoder may have to wait to receive an entire group of pictures (GOP), since only the receipt of an entire GOP guarantees a reference frame. The combined decoder delay can be noticeable, since the maximum timestamp interarrival time is 700 ms in MPEG-2, and in a typical system having 30 Hz frame rate and a GOP size of 12 frames, the GOP delay is 400 ms. Thus, the combined decoder delay can be over a second. Note that references herein to GOP are for illustrative purposes only, and some embodiments may use other types of intervals.

The portion of decoder delay attributable to timestamp arrival is reduced by the inventive techniques described herein, by which an "extra" timestamp is provided during the channel change process, at a point in the stream which is earlier than the conventional periodic timestamp. In the embodiments described herein, this functionality is provided by early timestamp logic 190, hereinafter referred to as early timestamp logic 190.

In the embodiments described herein, early timestamp logic 190 is part of channel change server 120. In other embodiments, early timestamp logic 190 is a separate component in system 100. In still other embodiments, early timestamp logic 190 is integrated with another hardware/software component, such as a media content server (not shown). Persons of ordinary skill in the art should appreciate in the context of the present disclosure that the functionality of early timestamp logic 190 can be distributed in other ways and among other components as well.

Next, an overview of how the early timestamp transmission fits into the overall channel change process will be given with reference to FIGS. 2 and 3. Further details of the early timestamp transmission process will then be given with reference to FIGS. 4-8.

Figure 2:
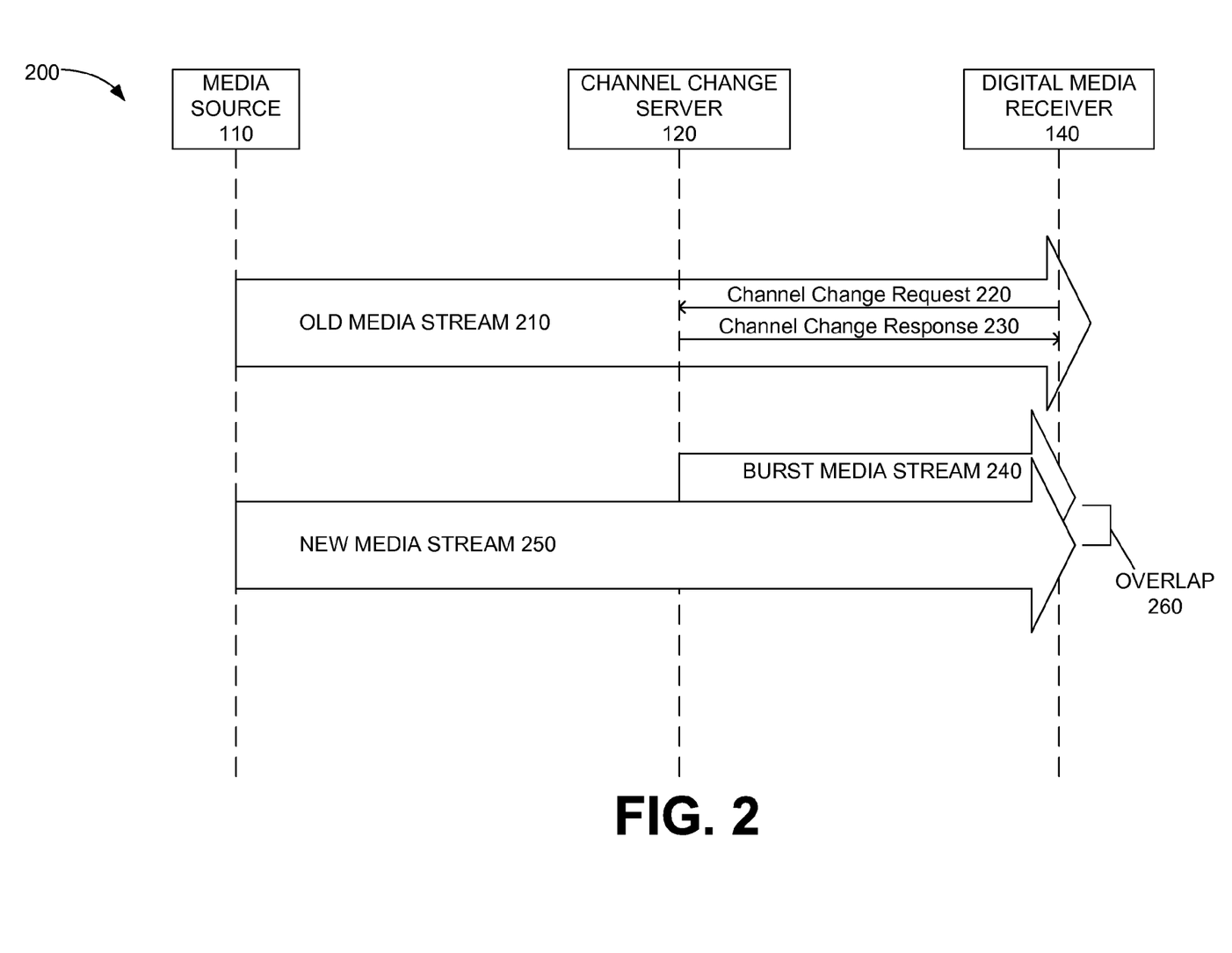
FIG. 2 is a message sequence diagram illustrating the exchange of information between some components during a channel change, in some embodiments of the system from FIG. 1.

FIG. 2 is a message sequence diagram illustrating the exchange of information between some components during a channel change, in some embodiments of system 100. At the start of sequence 200, digital media receiver 140 is receiving media stream 210 (the "old" media stream) from media source 110. While still receiving stream 210, digital media receiver 140 sends a request 220 to channel change server 120 for a new channel, and channel change server 120 sends back a response 230. A media source 110 will eventually provide a new stream carrying the requested channel, but until that happens, channel change server 120 generates a burst media stream 240 in response to the channel change request 220, where this burst media stream 240 includes interpolated timestamp(s) using the inventive techniques described herein.

While burst media stream 240 is still being transmitted, digital media receiver 140 starts receiving the new channel on a stream 250 sent from media source 110, producing a period of overlap (260) between the streams. During overlap period 260, digital media receiver 140 merges burst media stream 240 with the new stream 250, discarding duplicate data as necessary. When burst media stream 240 has finished, digital media receiver 140 receives only new stream 250. In some embodiments, digital media receiver 140 notifies channel change server 120 that channel change operation has been completed and new stream 250 is being received.

In some types of networks (e.g., IP networks), changing a channel involves digital media receiver 140 joining and leaving particular multicast groups, each of which carries a set of logical channels. Because this multicast procedure takes some time to complete, some channel change servers provide the requesting digital media receiver 140 with a unicast stream while waiting for the multicast procedure to complete and the new multicast stream to be delivered to digital media receiver 140. This use of unicast streams to speed up a channel change is sometimes referred to as "fast channel change" or "instant channel change".

Figure 3:
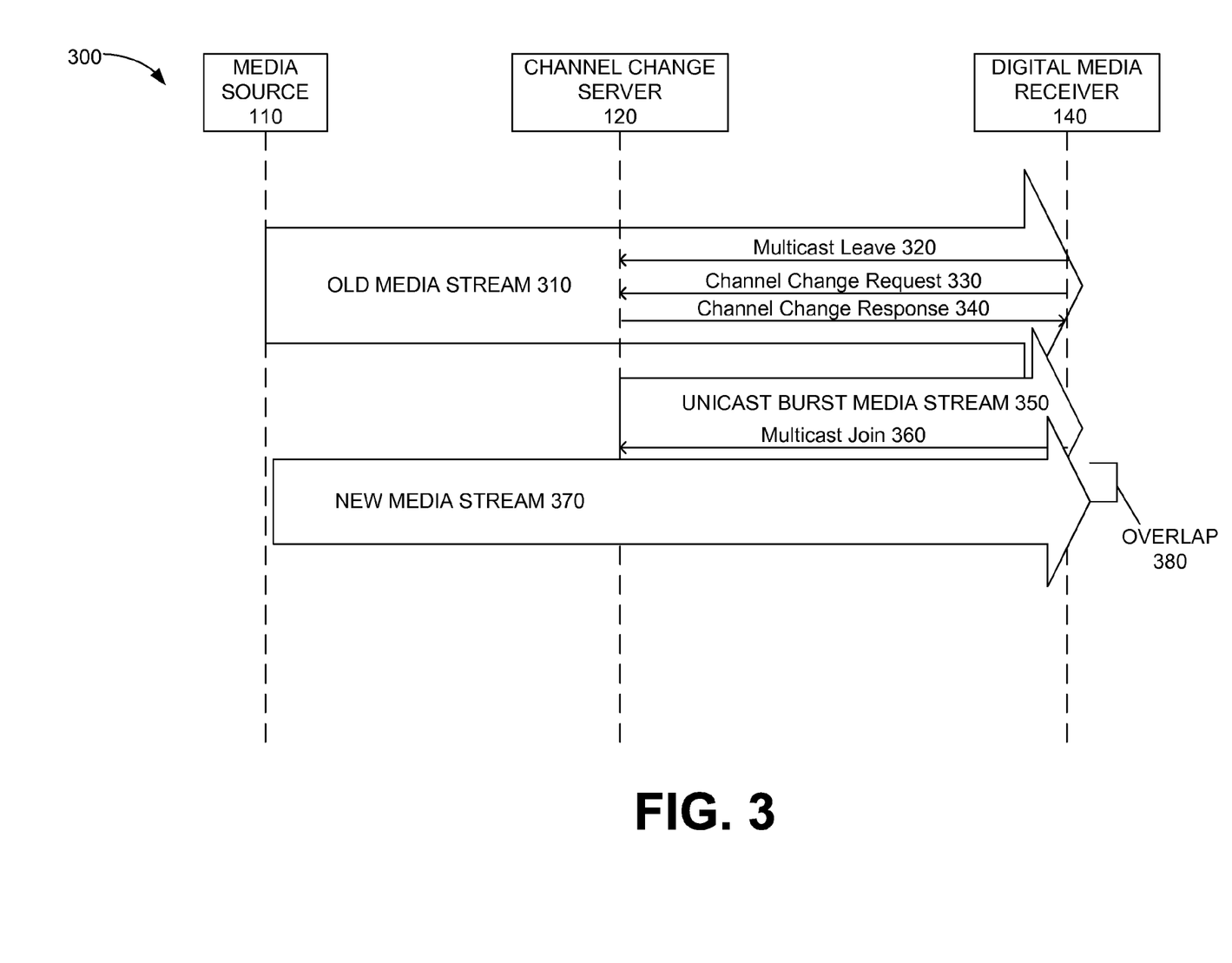
FIG. 3 is a message sequence diagram illustrating the exchange of information between some components during a channel change, in some embodiments of the system from FIG. 1.

Use of a unicast channel can be combined with the channel change timestamp transmission techniques disclosed herein, as shown in the message sequence diagram of FIG. 3. At the start of sequence 300, digital media receiver 140 is receiving media stream 310 (the "old" media stream) from media source 110. While still receiving stream 310, digital media receiver 140 sends a message 320 to channel change server 120 removing itself from the "old" multicast group (e.g., a multicast leave). Digital media receiver 140 then sends a request 330 to channel change server 120 for a new channel, and channel change server 120 sends back a response 340. A media source 110 will eventually provide a new multicast stream carrying the requested channel, but until that happens, channel change server 120 sends a unicast burst stream 350 carrying the requested channel. This unicast stream is a cached version of the requested media stream and always starts with a random access point (RAP) in the stream to minimize the time it takes for the decoder to start decoding the stream. In some embodiments, the RAP is an I-frame.

As a result of the channel change request 330, channel change server 120 uses the inventive techniques described herein to include additional timestamp(s) in unicast burst stream 350. While unicast burst stream 350 is being transmitted, digital media receiver 140 sends a message 360 to channel change server 120 adding itself to the "new" multicast group (e.g., a multicast join). At some point after this message and while still receiving unicast burst stream 350, digital media receiver 140 starts receiving the new channel on another multicast stream 370 sent from media source 110, producing an overlap (380) between the streams. During the overlap period, digital media receiver 140 merges unicast burst stream 350 and new multicast stream 370, discarding duplicate data as necessary. When unicast burst stream 350 has finished, digital media receiver 140 receives only new multicast stream 370. In some embodiments, digital media receiver 140 notifies channel change server 120 that channel change operation has been completed and new multicast stream 370 is being received.

Figure 4:
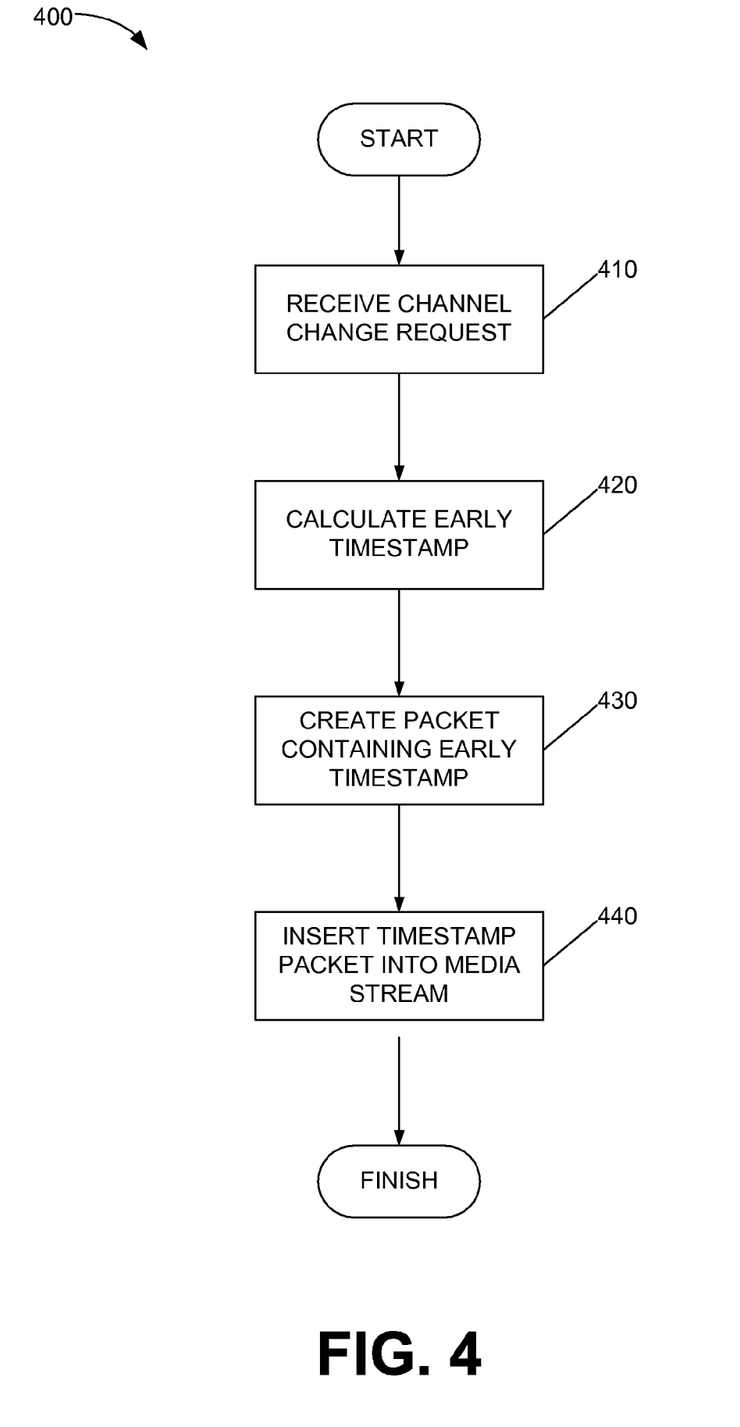
FIG. 4 is a flowchart of illustrating operation of one embodiment of logic for early timestamp transmission during channel change from FIG. 1.

FIG. 4 is a flowchart illustrating operation of one embodiment of early timestamp logic 190. Process 400 begins at block 410, where a channel change request is received from digital media receiver 140. As described above, channel change server 120 provides burst media stream 240 (or unicast burst stream 350) in response to the request. The provided burst stream includes an additional timestamp at a point in the stream which is earlier than the conventional periodic timestamp. The additional timestamp is an interpolated timestamp for the oldest frame in the burst stream. In the embodiments described herein, the early timestamp is a presentation timestamp (PTS) but other embodiments may include early decoding timestamps also.

The value of the early timestamp is calculated at block 420 by interpolating from timestamps in the requested stream which is already cached by channel change server 120. The interpolation is based on an explicit timestamp frame within the burst stream and on the position of the oldest frame in the burst stream, relative to the explicit timestamp frame. (The calculation will be discussed in further detail in connection with FIG. 5). At block 430, a packet containing the timestamp is created. The timestamp can be encapsulated into a packet in various ways, and the details of insertion into the transport stream will depend on the type of encapsulation used. Timestamp encapsulation will be discussed in further detail in connection with FIGS. 6-8.

At block 440, the timestamp packet is inserted into the media stream so that it represents the decoding or presentation time for a selected frame (an "early timestamp frame"), as follows. The timestamp represents the decoding or presentation time for a particular frame. Selection of this frame is described in more detail in connection with FIG. 5. That frame(s) is preceded by a video elementary stream header (e.g., picture header). The timestamp is positioned in the video elementary stream such that it immediately precedes that header.

It is this positioning of the timestamp within the video elementary stream that associates a timestamp with a frame. However, using a separate transport packet to convey the timestamp allows the positioning of the timestamp within the transport stream to be more flexible. Other transport packets with different PIDs may appear in the transport stream between the timestamp and the video elementary stream headers (e.g., PCR PIDs, CA PIDs, etc). Even so, when digital media receiver 140 demultiplexes and filters out other PIDs from the transport stream (TS), the TS packet that contains the early timestamp does immediately precede the transport packet that contains the elementary stream headers and the following frame data.

Figure 5:
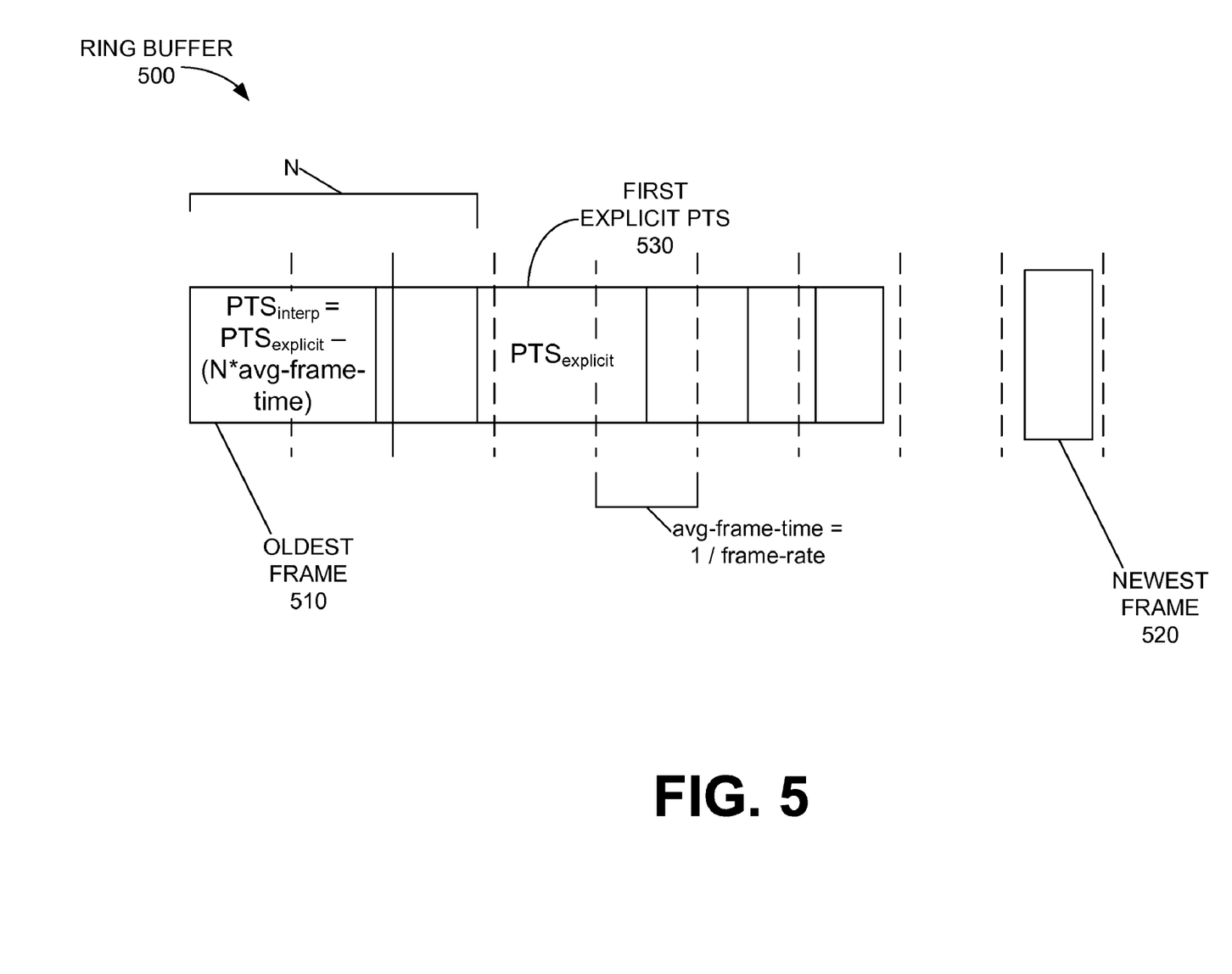
FIG. 5 illustrates early timestamp calculation in accordance with one embodiment of the logic for early timestamp transmission during channel change from FIG. 1.

FIG. 5 illustrates early timestamp calculation in accordance with one embodiment of early timestamp logic 190. Channel change server 120 includes a ring buffer 500 which caches frames received in media stream 310 from media source 110 (or other content server). As should be understood by a person of ordinary skill in the art, ring buffer 500 contains the last N seconds (or minutes, or another unit of time) produced by media source 110. Index 510 tracks the position of the oldest frame, while index 520 tracks the position of the newest frame.

On receiving a channel change request, channel change server 120 generates burst media stream 240 from the frames in ring buffer 500, starting at oldest 510. To calculate the early timestamp value, logic 190 locates or identifies the first frame in ring buffer 500 which includes a PTS field (i.e., an explicitly coded PTS rather than an interpolated value). In the example of FIG. 5, the first frame with an explicit PTS is 530. Logic 190 then calculates an interpolated timestamp for the oldest frame 510 in ring buffer 500 as follows. Logic 190 determines the number of frames (N), in display order, between this first frame with an explicit PTS (530) and the oldest frame 510. Logic 190 multiplies N by the average frame transmission time (i.e., inverse of frame rate in Hz) to get the time difference between the explicit timestamp and the early timestamp. Logic 190 then subtracts that difference from the explicitly coded PTS to obtain the interpolated timestamp for the oldest frame 510—i.e., the early timestamp. Since this oldest frame is the frame for which an early timestamp is calculated, this oldest frame is also referred to herein as an "early timestamp frame".

Figure 6:
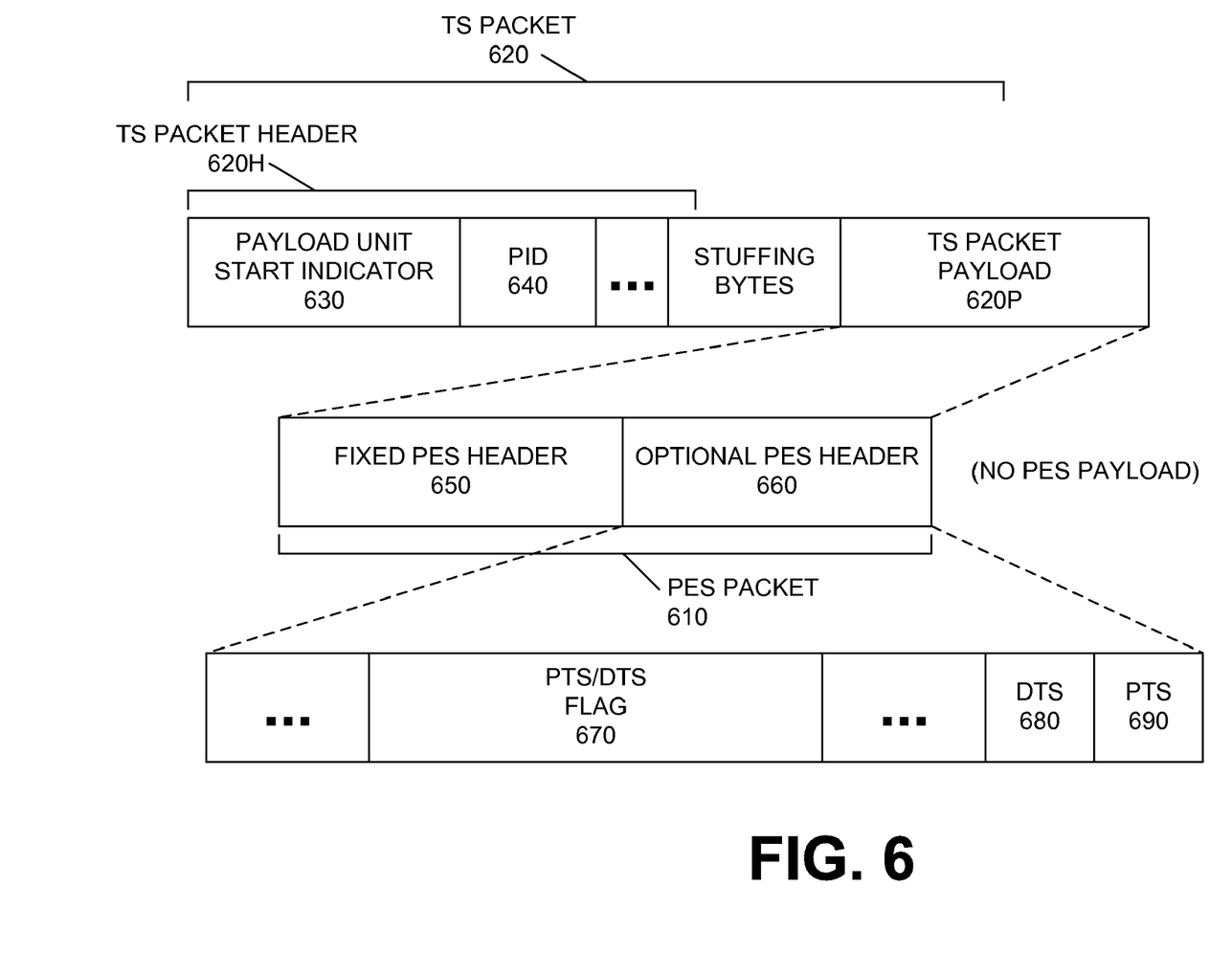
FIG. 6 illustrates timestamp encapsulation in accordance with one embodiment of logic for early timestamp transmission during channel change from FIG. 1.

FIG. 6 illustrates timestamp encapsulation in accordance with one embodiment of early timestamp logic 190. In this embodiment, the burst media stream 240 (or 350) produced by logic 190 carries the early timestamp (PTS, DTS, or both) in an MPEG packetized elementary stream (PES) packet 610. This PES packet 610 is in turn encapsulated in an MPEG transport stream (TS) packet 620.

TS packet 620 includes a TS packet header 620H and a TS packet payload 620P, where PES packet 610 is carried in TS packet payload 620P. The timestamp within PES packet 610 fits completely within the PES packet header, so the timestamp fits into a single TS packet 620. Since a TS packet 620 has a fixed size, the remaining TS payload bytes are stuffed (e.g., with 0xFF).

A TS packet is 188 bytes long, which is small relative to a PES packet. Thus, in general a PES packet can span many TS packets. TS packet header 620H therefore includes a Payload Unit Start Indicator field 630 which is set when the TS packet includes the start of a PES packet. Since the early timestamp fits into a single TS packet, logic 190 sets the Payload Unit Start Indicator field 640 in TS packet header 620H. TS packet header 620H also includes a field for program identifier (PID) 640, which logic 190 sets to the PID value associated with burst media stream 240 (or 350).

The early timestamp calculated by logic 190 is carried within PES packet 610 as follows. PES packet 610 includes a fixed PES header 650, followed by an optional PES header 660. A PTS/DTS flag field 670 within optional PES header 660 specifies whether optional fields for DTS 680, PTS 690, or both, are included within optional PES header 660. Since the early timestamp can be completely carried within optional PES header 660, no PES packet payload is required.

If the early timestamp is a presentation timestamp (PTS), then logic 190 sets PTS/DTS flag field 670 to a "PTS" value (in one embodiment, this value is '10') and stores the early presentation timestamp value in PTS field 690. If an early decoding timestamp (DTS) is also included, then logic 190 sets PTS/DTS flag field 670 to a "DTS/PTS" value (in one embodiment, this value is '11'), stores the early presentation timestamp in PTS field 690, and stores the early decoding timestamp value in DTS field 680. (Calculation of the timestamp value was discussed earlier in connection with FIG. 5.)

The embodiment of FIG. 6 carries the early timestamp in an MPEG TS packet. (This form of encapsulation is referred to herein as "native MPEG-TS encapsulation"). This is particularly appropriate in systems which do not use UDP (User Datagram Protocol) or Internet Protocol (IP) as a transport layer for media streams, and use the MPEG transport stream alone. However, other systems use both MPEG and IP to carry media streams (referred to herein as "MPEG-TS-over-IP" systems, and commonly known as "IPTV systems"). Several variations of MPEG-TS-over-IP are possible. In one variation, MPEG-TS packets are encapsulated directly within UDP packets, which are in turn encapsulated within IP packets. In another variation, MPEG-TS packets are encapsulated within RTP packets, using a specific payload format (e.g., the format specified in RFC 2250). The RTP packets are in turn encapsulated within UDP packets and then IP packets. This second form of media encapsulation is referred to herein as "MPEG-TS-over-RTP". In some embodiments, the companion protocol Real-Time Control Protocol (RTCP) carries MPEG program-specific information (PSI) such as a program map table (PMT), program allocation table (PAT), etc. during the channel change acceleration.

Figure 7:
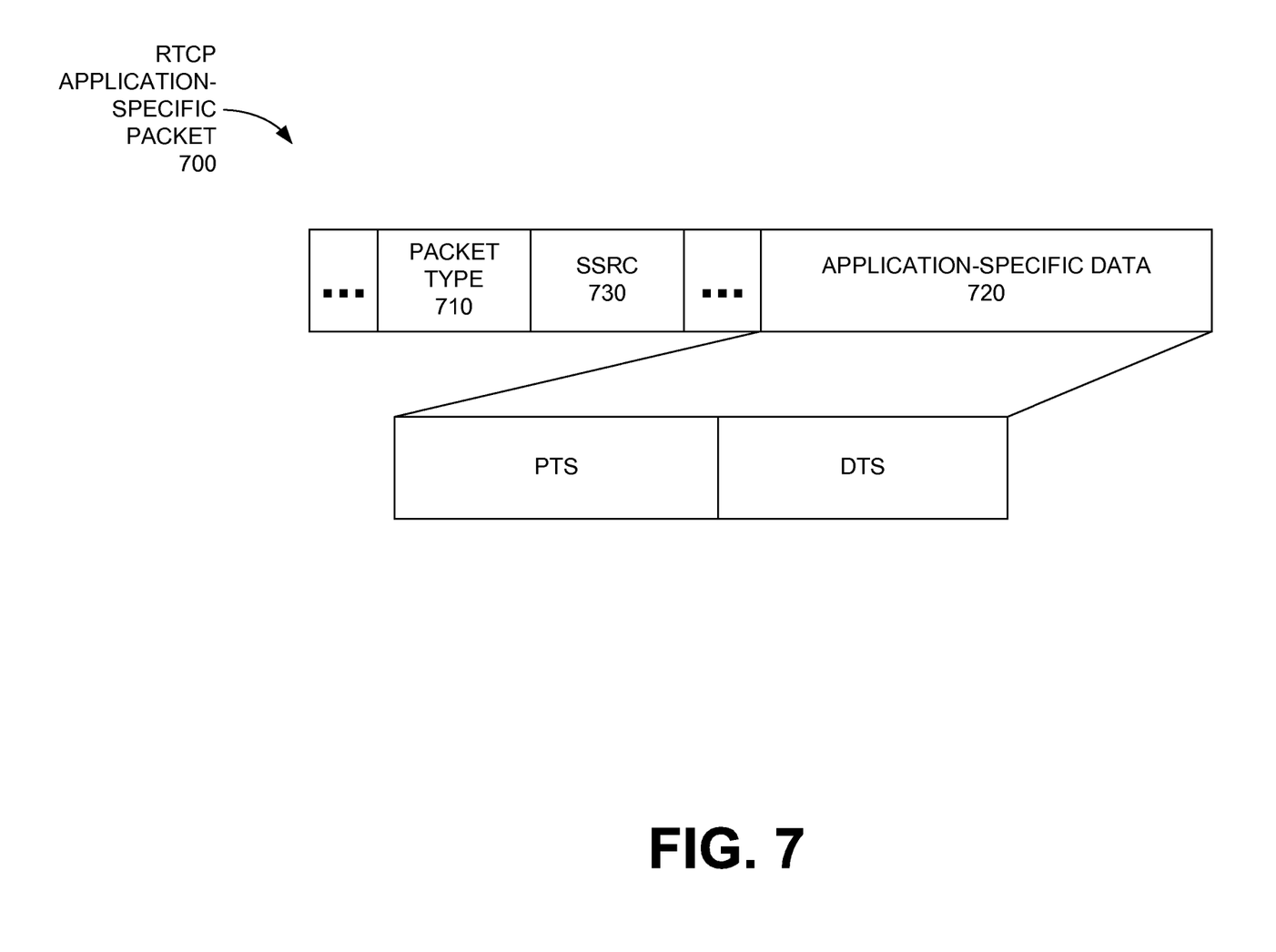
FIG. 7 illustrates timestamp encapsulation using Real-Time Control Protocol (RTCP), in accordance with yet another embodiment of logic for early timestamp transmission during channel change from FIG. 1.

FIG. 7 illustrates timestamp encapsulation using RTCP, in accordance with yet another embodiment of early timestamp logic 190. Logic 190 carries the early timestamp in an RTCP application-specific (APP) packet 700. (This form of encapsulation is referred to herein as "native RTCP encapsulation"). To generate an RTCP APP packet 700, logic 190 sets packet type field 710 to a constant value representing the packet type as application-specific (e.g., 204). Logic 190 stores an early timestamp value (PTS, DTS, or both) in the application-dependent data field 720. Data field 720 may include flags (not shown) which indicate which value(s) are present. APP packet 700 also includes a field for synchronization source identifier (SSRC) 730, which logic 190 sets to the SSRC value associated with burst media stream 240 (or 350). The remaining fields within APP packet 700, such as version, padding, and length fields (not shown), are appropriately set by logic 190, as should be understood by a person of ordinary skill in the art. Similarly, a new RTCP payload-specific feedback message can also be specified to carry exactly the same information.

In embodiments of early timestamp 190 which use APP packet 700 to carry the timestamp, an RTP client application in media receiver 140 extracts the early timestamp from RTCP APP packet 700, and the early timestamp is provided directly to the decoder. The decoder thus differs from a conventional decoder design by explicitly receiving a frame timestamp rather than extracting a frame timestamp embedded in a transport packet.

Figure 8:
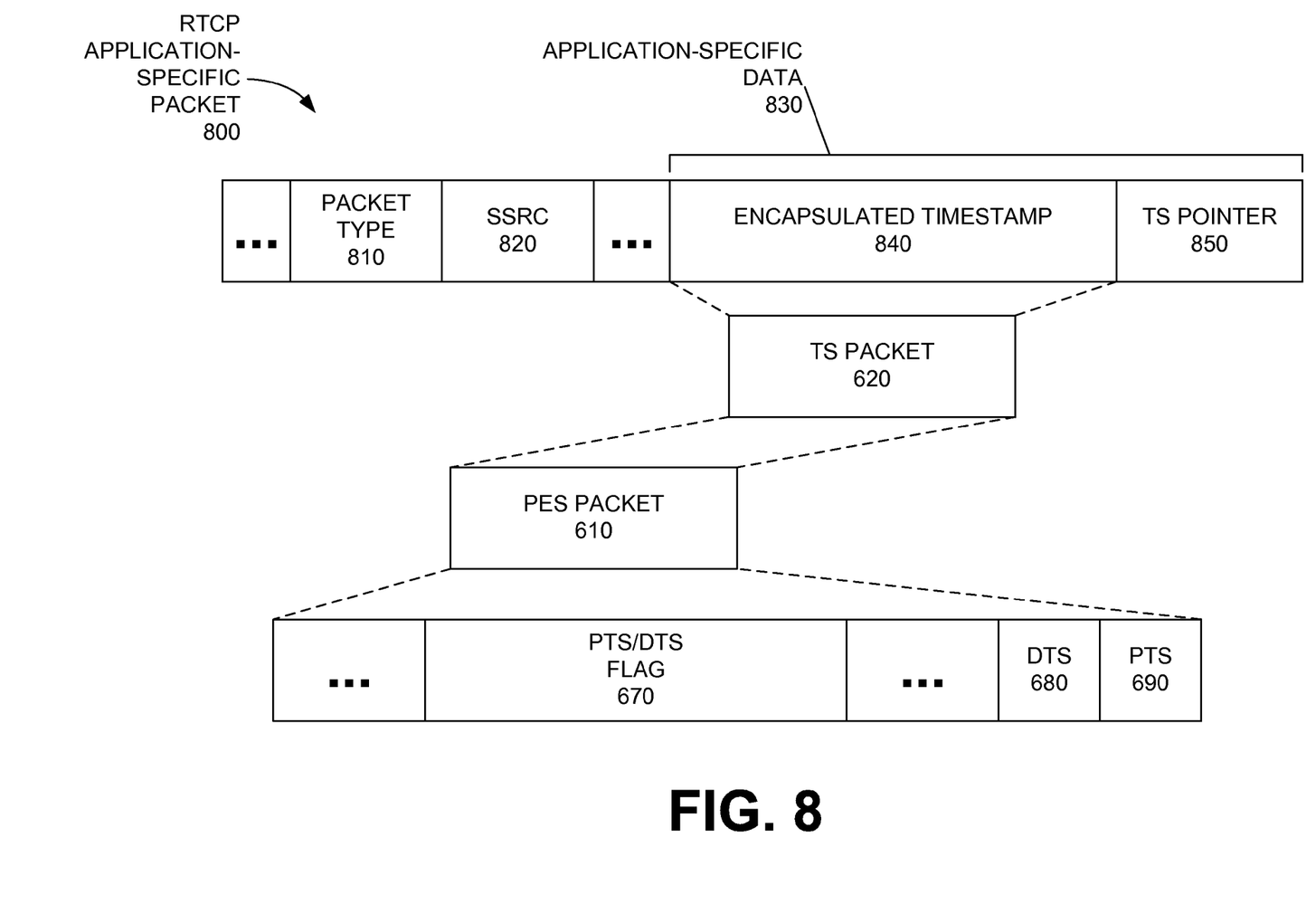
FIG. 8 illustrates timestamp encapsulation using MPEG-TS and RTCP, in accordance with yet another embodiment of logic for early timestamp transmission during channel change from FIG. 1.

FIG. 8 illustrates timestamp encapsulation using MPEG-TS and RTCP, in accordance with yet another embodiment of early timestamp logic 190. This embodiment is similar to that of FIG. 7, in that logic 190 carries the early timestamp within an RTCP APP packet. However, in the embodiment of FIG. 7, the early timestamp is carried directly within an RTCP APP packet. In contrast, in the embodiment of FIG. 8 the early timestamp is encapsulated within an MPEG-TS packet, which is in turn encapsulated within an RTCP APP packet. In this variation, the encapsulation with an MPEG-TS packet is accomplished using the same techniques described above in connection with FIG. 6. The APP packet 800 header fields are the same as described above: packet type field 810 is set to constant value (e.g., 204); synchronization source identifier (SSRC) 820 is set to the SSRC value associated with burst media stream 240 (or 350); and version, padding, and length fields (not shown) are set as appropriate. This embodiment is also the same as the embodiment of FIG. 7 in that the timestamp value is stored in the application-dependent data field 830. However, as mentioned above, it is not the timestamp alone that logic 190 stores in APP packet 800, but an encapsulated timestamp 840 (within a PES packet 610 within a TS packet 620). Similarly, a new RTCP payload-specific feedback message can also be specified to carry exactly the same information.

Application-dependent data field 830 also includes a transport stream pointer 850 which tells the receiver of the packet—digital media receiver 140—where the TS packet 620 carrying the early timestamp is to be inserted into the received transport stream. In one embodiment, pointer 850 is a byte count, with zero indicating the first byte of the new burst stream that is received after a channel change. The RTCP client within digital media receiver 140 parses the APP packet 800, and uses pointer 850 to insert the received TS packet with the early timestamp into the appropriate position in the transport stream. The (updated) transport stream is then processed by the transport demultiplexer in the conventional manner, and the timestamp is provided to the decoder in the conventional manner. Thus, this approach does not require any change to the decoder.

Figure 9:
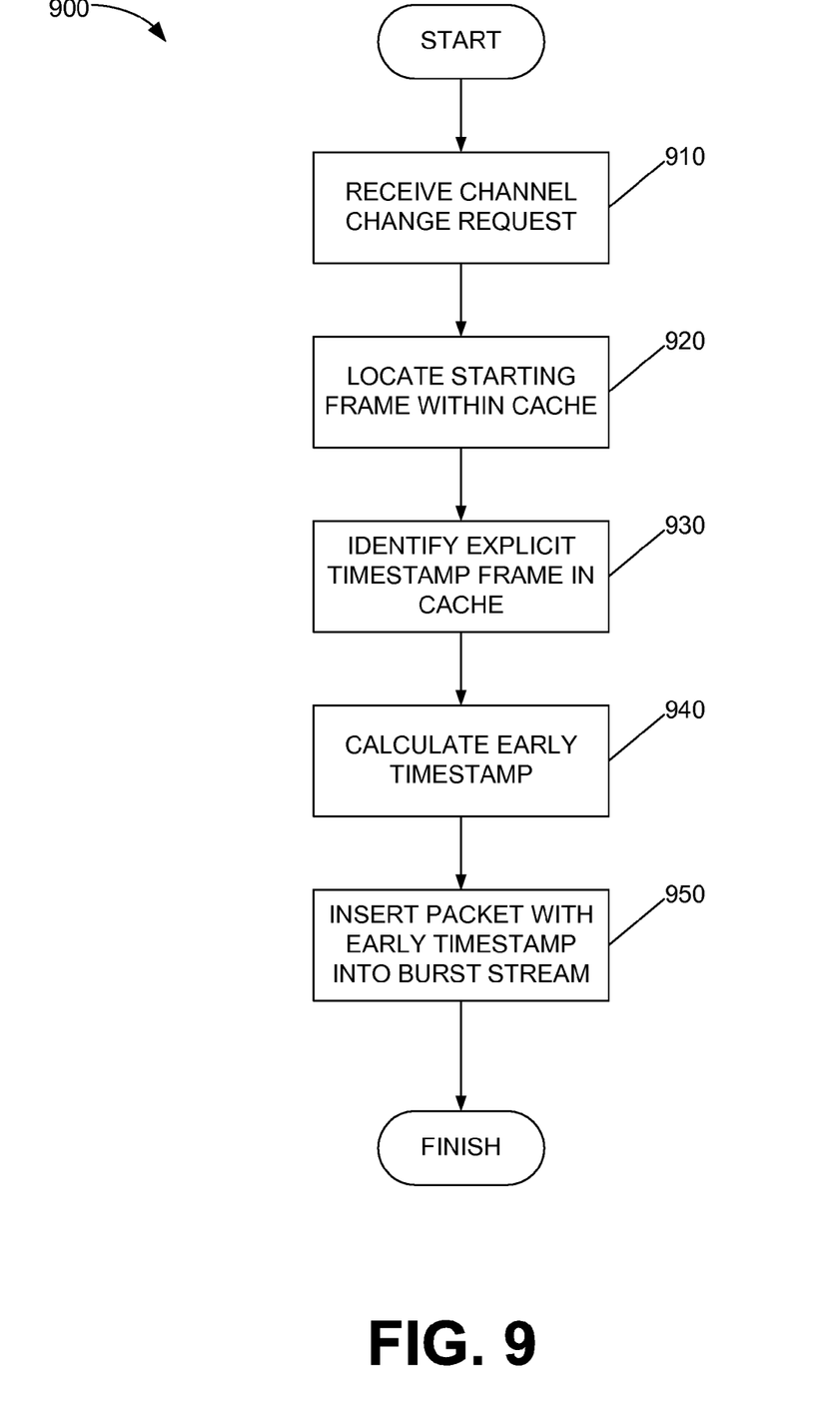
FIG. 9 is a flowchart of illustrating operation of one embodiment of logic for early timestamp transmission during channel change from FIG. 1.

FIG. 9 is a flowchart illustrating operation of one embodiment of early timestamp logic 190. Process 900 begins at block 910, where a channel change request is received. In response to the channel change request, process 900 performs the following actions. At block 920, a starting frame is selected or located within the cache of frames stored by channel change server 120. At block 930, an explicit timestamp frame is identified with the cache of frames. At block 940, an early timestamp value is calculated, based on the explicit timestamp frame and the starting frame. That early timestamp value represents the interpolated timestamp for the oldest frame within the cache. Finally, at block 950 a packet containing the early timestamp value is inserted into burst media stream 240, where burst media stream 240 contains some number of frames from the cache. Process 900 is then complete.

Figure 10:
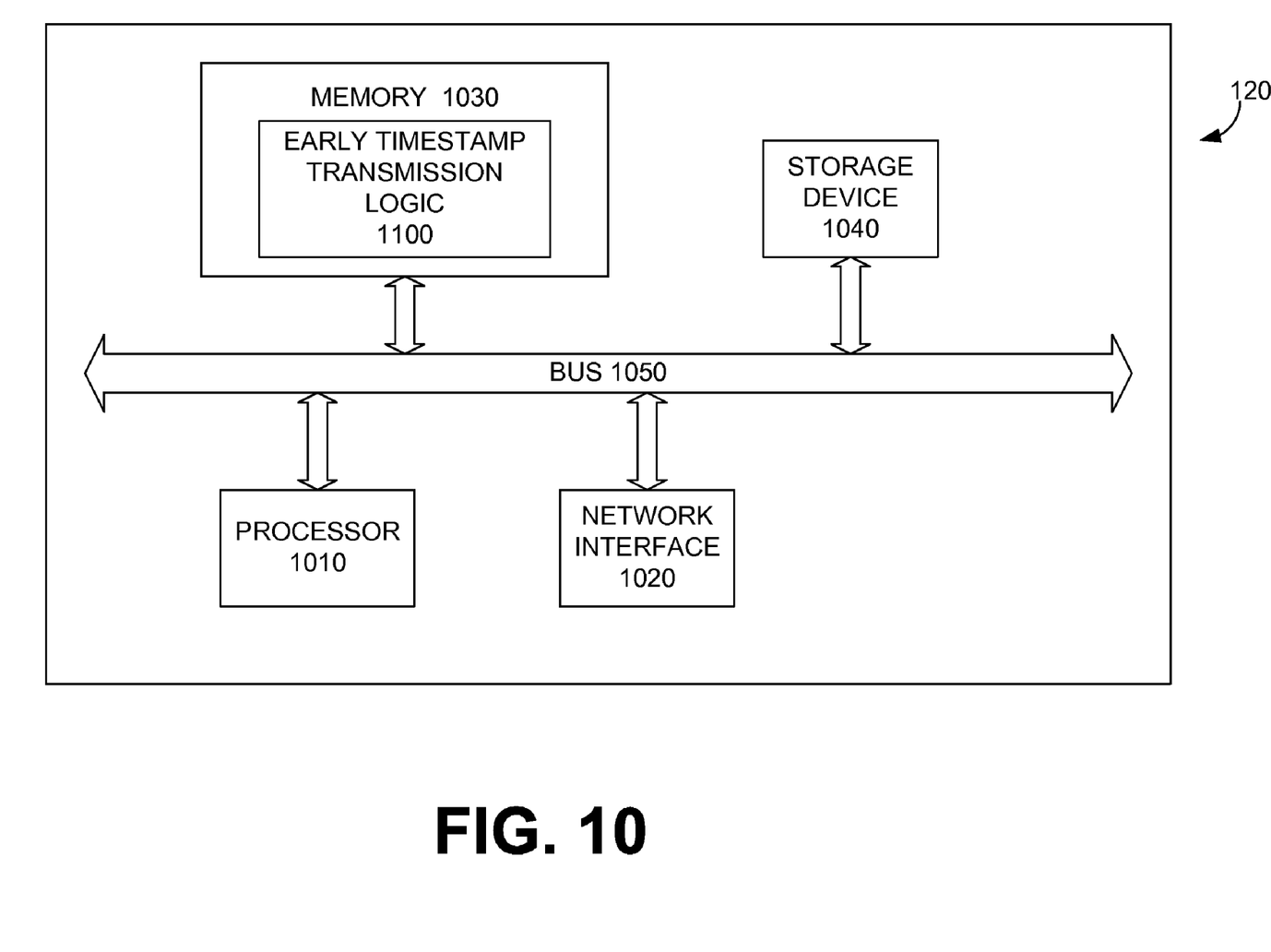
FIG. 10 is a hardware block diagram of one embodiment of the channel change server from FIG. 1.

FIG. 10 is a hardware block diagram of one embodiment of channel change server 120. Channel change server 120 contains a number of components that are well known in the computer arts, including a processor 1010, a network interface 1020, memory 1030, and a storage device 1040 (e.g., non-volatile memory or a disk drive). These components are coupled via a bus 1050. Omitted from FIG. 10 are a number of conventional components that are unnecessary to explain the operation of early timestamp logic 190.

Early timestamp logic 190 may be implemented in hardware, or may reside in memory 1030 as instructions which, when executed by processor 1010, implement systems and methods of reducing decoder delay. Hardware implementations include, but are not limited to, a programmable logic device (PLD), programmable gate array (PGA), field programmable gate array (FPGA), an application-specific integrated circuit (ASIC), a system on chip (SoC), and a system in package (SiP). Furthermore, early timestamp logic 190 may be implemented as a combination of hardware logic and processor-executable instructions (software).

Early timestamp logic 190 can be embodied in any computer-readable medium for use by or in connection with any apparatus or device which includes a processor, or any system which can fetch and execute instructions. In the context of this disclosure, a "computer-readable medium" can be any means that can contain or store the instructions for use by the processor. The computer readable medium can be (for example, but not limited to) a system or that is based on electronic, magnetic, optical, electromagnetic, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The software components illustrated herein are abstractions chosen to illustrate how functionality is partitioned among components in some embodiments of early timestamp logic 190 disclosed herein. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Software components are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of systems and methods of reducing media stream delay, according to embodiments disclosed herein. Alternatively, these diagrams may be viewed as depicting actions of an example of a method implemented by logic for systems and methods of reducing media stream delay. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. An apparatus comprising:
    means for caching a series of frames from a received media stream;
    means for interpolating a timestamp value based on a selected starting frame from the series of cached frames and on an identified explicit timestamp frame in the series of cached frames wherein the means for interpolating further comprises means for calculating the timestamp value by interpolating backward from the identified explicit timestamp frame to the selected starting frame, using an explicit timestamp value in the explicit timestamp frame, the number of frames between the explicit timestamp frame and the starting frame, and an average frame rate; and means for providing a media stream carrying a packet containing the interpolated timestamp value, wherein the means for interpolating and the means for providing are responsive to receiving a channel change request.

2. The apparatus of claim 1, further comprising:

means for selecting an oldest frame in the series of cached frames as the selected starting frame.

3. The apparatus of claim 1, wherein the packet containing the timestamp is an RTCP packet.

4. The apparatus of claim 1, wherein the packet containing the timestamp is an MPEG-TS packet.

5. The apparatus of claim 1, wherein the packet containing the timestamp is an MPEG-TS packet which is in turn encapsulated in an RTCP packet.

6. An apparatus comprising:

memory storing executable instructions thereon; and a processor configured by the executable instructions to:

responsive to a channel change request, locate a starting frame in a series of cached frames;

identify one of the series of cached frames as an explicit timestamp frame;

calculate a timestamp value for an early timestamp frame, based on the explicit timestamp frame and the starting frame wherein the processor being configured to calculate the timestamp value comprises the processor being configured to calculate the timestamp value for the early timestamp frame by interpolating backward from the explicit timestamp frame to the starting frame, using an explicit timestamp value in the explicit timestamp frame, the number of frames between the explicit timestamp frame and the starting frame, and an average frame rate of the stream; and insert a packet containing the timestamp value into a stream of media packets containing at least a portion of the series of cached frames.

7. The apparatus of claim 6, wherein the processor is further configured by the executable instructions to:

identify the oldest frame in the series of cached frames as the starting frame.

8. The apparatus of claim 6, wherein the packet containing the timestamp value is an RTCP packet.

9. The apparatus of claim 6, wherein the packet containing the timestamp value is an MPEG-TS packet.

10. The apparatus of claim 6, wherein the packet containing the timestamp value is an MPEG-TS packet which is in turn encapsulated in an RTCP packet.

11. A method for reducing delay in decoding, the method comprising:

caching a series of frames from a received media stream;

interpolating a timestamp value based on a selected starting frame from the series of cached frames and on an identified explicit timestamp frame in the series of cached frames wherein interpolating further comprises calculating the timestamp value by interpolating backward from the identified explicit timestamp frame to the selected starting frame, using an explicit timestamp value in the explicit timestamp frame, the number of frames between the explicit timestamp frame and the starting frame, and an average frame rate; and providing a media stream carrying a packet containing the interpolated timestamp value, wherein interpolating and providing are responsive to receiving a channel change request.

12. The method of claim 11, further comprising selecting an oldest frame in the series of cached frames as the selected starting frame.

13. The method of claim 11, wherein the packet containing the timestamp is an RTCP packet.

14. The method of claim 11, wherein the packet containing the timestamp is an MPEG-TS packet.

15. The method of claim 11, wherein the packet containing the timestamp is an MPEG-TS packet which is in turn encapsulated in an RTCP packet.

\* \* \* \* \*